June 30, 1953 — W. C. TROENDLE — 2,643,893
CONVERTIBLE FOLDING BABY CARRIAGE

Filed Nov. 1, 1951 — 4 Sheets-Sheet 1

*INVENTOR.*
WILLIAM C. TROENDLE
BY Charles R. Fay,
ATTORNEY

INVENTOR.
WILLIAM C. TROENDLE
BY Charles R. Fay,
ATTORNEY

June 30, 1953   W. C. TROENDLE   2,643,893
CONVERTIBLE FOLDING BABY CARRIAGE
Filed Nov. 1, 1951   4 Sheets-Sheet 3

INVENTOR.
WILLIAM C. TROENDLE
BY Charles R. Jay,
ATTORNEY

June 30, 1953          W. C. TROENDLE          2,643,893

CONVERTIBLE FOLDING BABY CARRIAGE

Filed Nov. 1, 1951          4 Sheets-Sheet 4

INVENTOR.
WILLIAM C. TROENDLE
BY
Charles R. Fay,
ATTORNEY

Patented June 30, 1953

2,643,893

UNITED STATES PATENT OFFICE 2,643,893

CONVERTIBLE FOLDING BABY CARRIAGE

William C. Troendle, Gardner, Mass., assignor to Thayer Company, Gardner, Mass., a corporation of Massachusetts Application November 1, 1951, Serial No. 254,351

5 Claims. (Cl. 280—36)

This invention relates to new and improved convertible folding baby carriages and strollers, and one of the principal objects of the invention is to provide a convertible folding carriage which has a rigid body rather than the conventional folding fabric body, for improved appearance, increased durability, safety, and ease in handling, both as to converting from a carriage to a stroller and from folded to unfolded condition and vice versa.

Further objects of the invention include the provision of a convertible carriage or stroller as above described including a supporting running gear, a frame mounted on the running gear in generally fixed relationship thereto, said frame being provided with two pairs of vertically swinging levers, one of the pairs of levers being located at one end of the frame and the other at the opposite end, said levers being pivotally connected in pairs, respectively to two opposite rigid sides of the carriage which go to make up the body thereof, in combination with easily operated locking or latching means for maintaining the levers in generally upright condition and the carriage body in extended condition ready for use, said latch means being conveniently releasable to allow the rigid body to swing downwardly on the levers to rest upon the running gear in folded condition thereof.

Other objects of the invention include the provision of the device as described including a reversible hood and a reversible pusher handle, and adjustable back rest and an adjustable foot well, said pusher handle, back rest, foot lever and hood all having means for holding the same selectively folded or unfolded in combination with the carriage itself whereby various parts may be folded or unfolded into the most compact form possible.

Other objects and advantages of the invention will appear hereinafter.

Reference is to be had to the accompanying drawings in which

Figure 1:
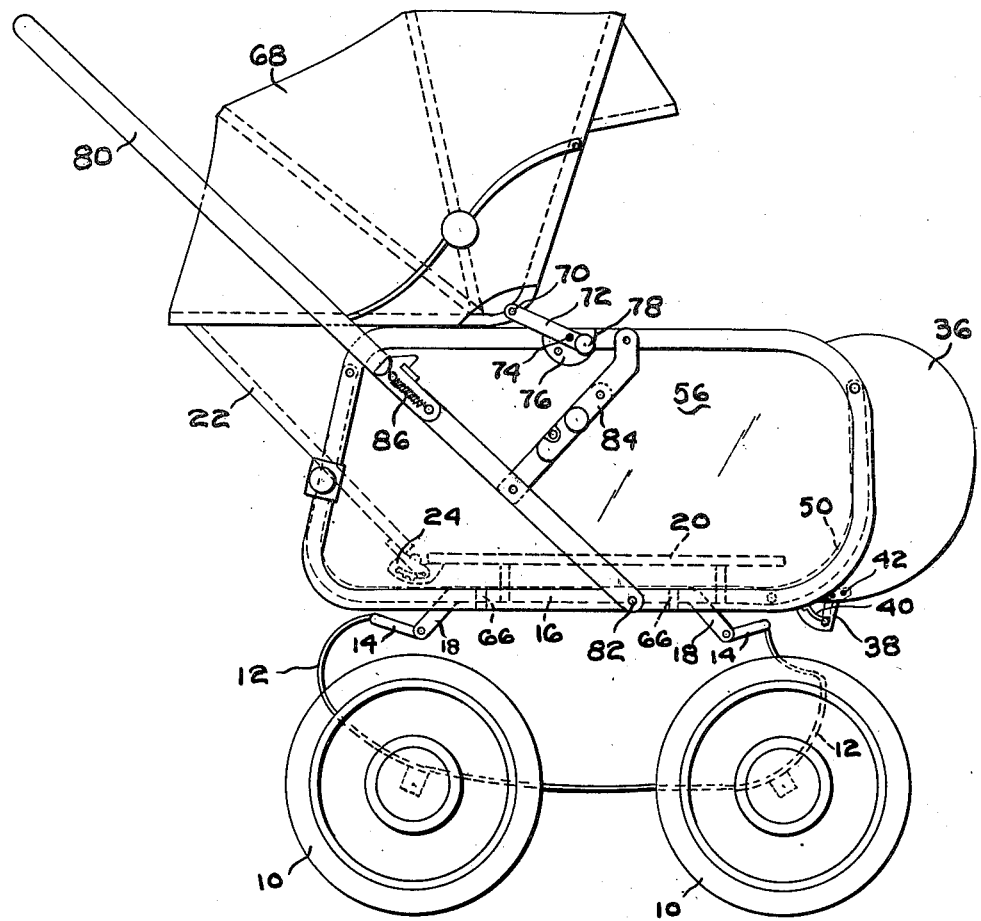
Fig. 1 is a view in elevation showing the convertible folding carriage in extended condition ready for use.
Figure 2:
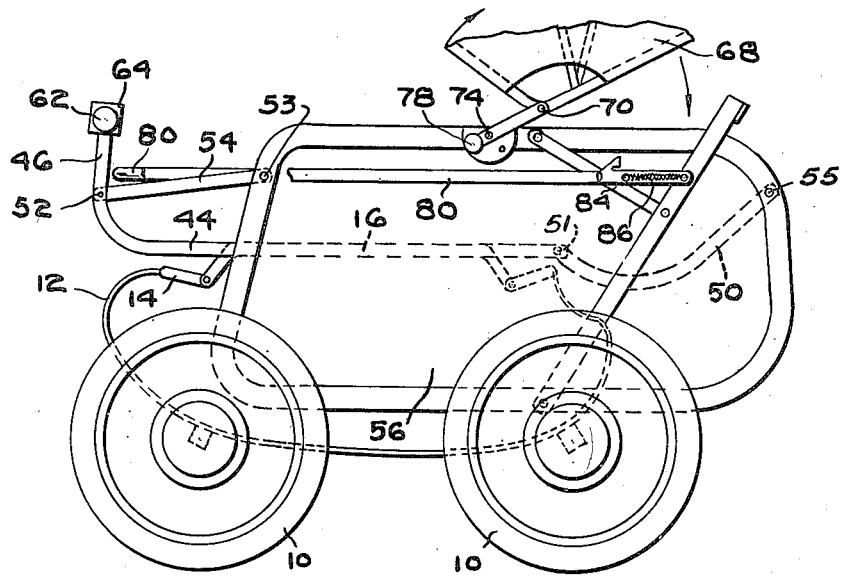
Fig. 2 is a similar view showing the same folded.
Figure 3:
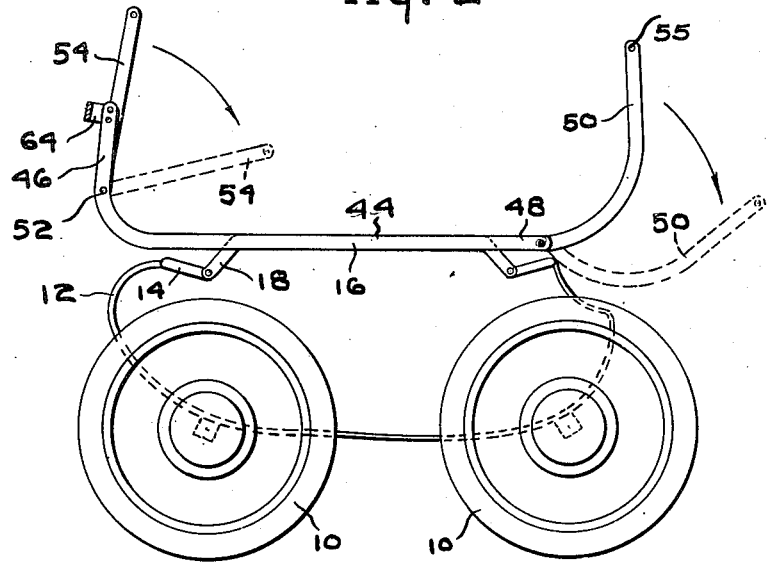
Fig. 3 is a view in elevation of the body supporting frame only.

In the art of baby carriages and strollers, there have been two general types, i. e. one type in which a flexible body member is made to fold so that the carriage or stroller may be easily carried or conveniently stored; and the other type is the rigid non-folding type which in some cases is found to be preferable from the point of view of durability, safety, etc. because in this type of carriage or stroller the sides are rigid and may be made of plywood, metal, and similar relatively strong materials. This invention provides a combined novel type of carriage and stroller which is not only folding for ease of storage and transportation, but which has rigid sides providing for the advantages derived from the non-folding rigid type of carriage.

In the drawings, the numeral 10 indicates two pairs of wheels which may be mounted as usual on a running gear comprising the bow springs 12, shackles 14, and other well-known and similar parts. In this case, the shackles 14 support in pairs, a front and rear frame member or rod 16 having downturned ends 18, and the bottom of the convertible cariage body as at 20 is supported on these rods.

Figure 6:
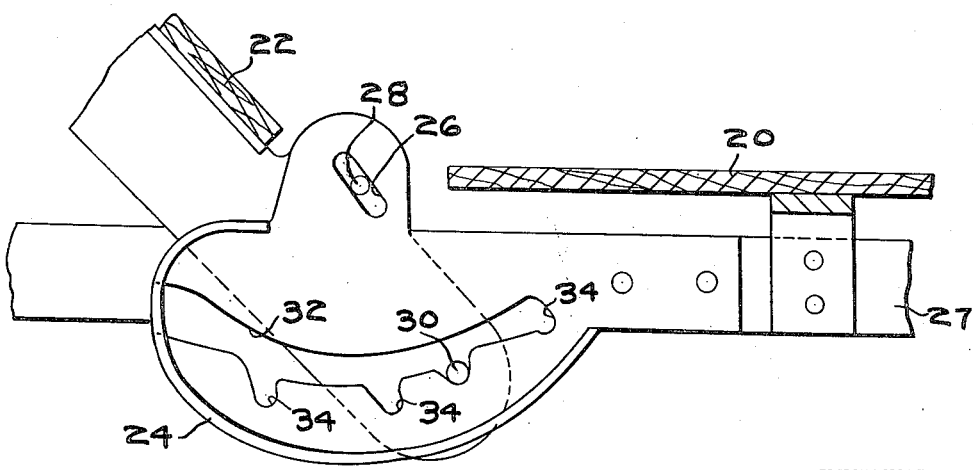
Fig. 6 is an enlarged view showing the back rest adjustment.
Figure 7:
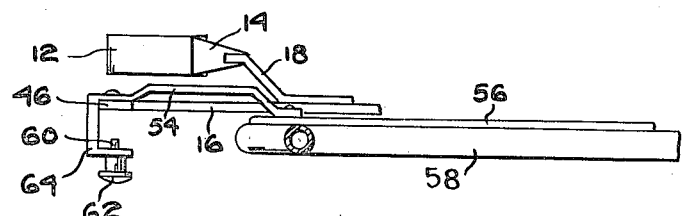
Fig. 7 is a top plan view of the parts of Fig. 5.
Figure 8:
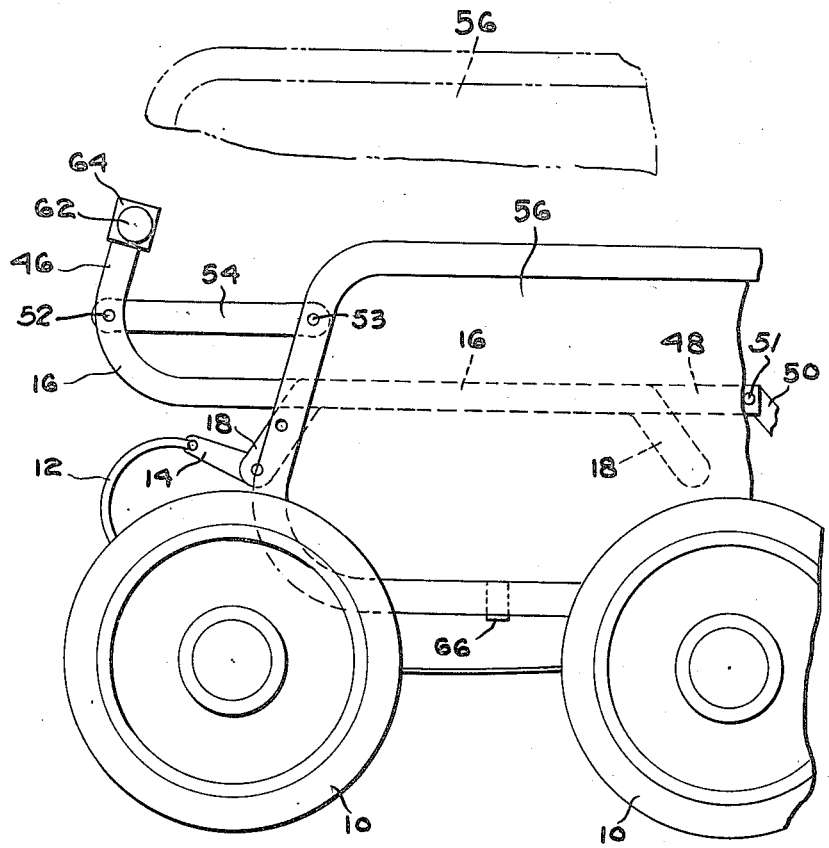
Fig. 8 is a view in side elevation, parts being broken away, showing the connections between the movable sides of the carriage and the supporting frame therefor.

At one end of the carriage body bottom 20 there is provided a back rest 22 which is angularly adjustable relative thereto and held in such angular position by means of brackets 24, see particularly Fig. 6. Brackets 24 are, of course, in pairs and each is provided with a small slot 26, in each of which works a pin 28 mounted on the back rest 22. Back rest 22 has another pair of pins 30 which work simultaneously in a long curved slot 32 generally taken on the arc of a circle having a center approximately in the axis of pins 28. Slot 32 is provided with a series of notches 34. It will be clear that the back rest may be easily manipulated to lie substantially flat or to extend substantially vertically upright, or selectively to assume various angular positions between these extremes.

At the forward ends of rods 16 there is pivoted a foot well 36 which may assume either a dropped-down position when the device is used as a stroller or a more upright position as shown in Fig. 1 when the device is used as a carriage. A bracket 38 is provided with a pin and slot arrangement at 40 to accomplish this purpose, the foot well 36 being pivoted at 42 to the brackets 38.

The rods 16 have secured thereto additional bars 44 which are horizontal and terminate at one end in upwardly-bent extensions 46. Bars 44 terminate at the opposite ends thereof in ends 48 to which are pivoted levers 50 at 51. There is a bar 44, extension 46, and lever 50 at each side of the carriage. The extensions 46 are provided with pivot pins 52 pivotally mounting levers 54.

The free ends of levers 54 and 50 are provided with pivot pins 53 and 55 respectively pivotally mounting thereon the rigid flat carriage sides 56 for swinging movement therewith and thereon, and it will be seen that the sides 56 are thereby movable from the position of Fig. 1 wherein the bottom edges of sides 56 are more or less aligned with rods 16, down and forwardly, to a position wherein the bottom edges of sides 56 are substantially in line with the wheel axles.

Figure 4:
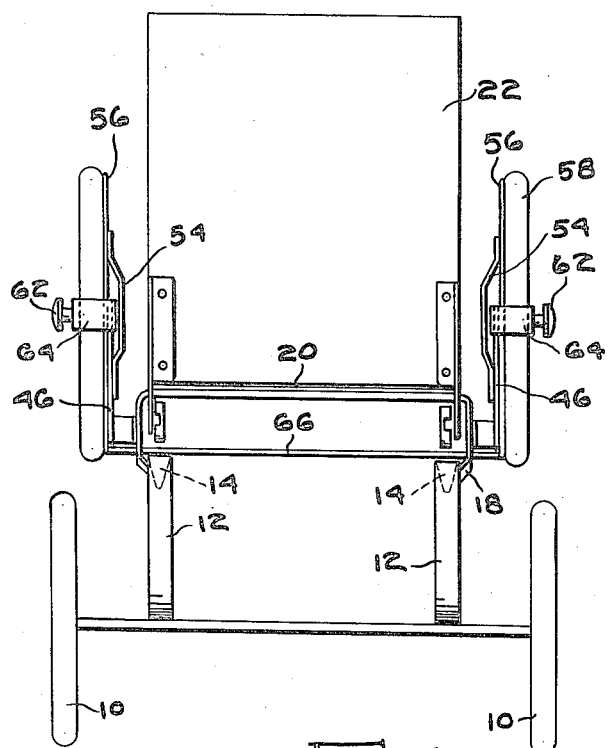
Fig. 4 is a view in rear elevation of the carriage.
Figure 5:
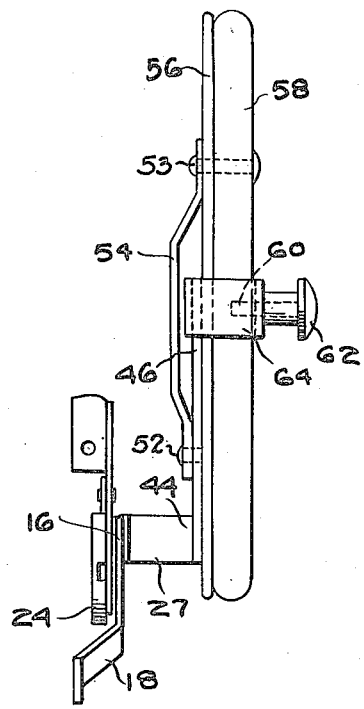
Fig. 5 is a view on an enlarged scale showing one rigid side of the folding carriage.

The rods 16 and carriage bottom 20 do not move but are always supported in the position shown in Fig. 1, and the sides 56 are rocked downwardly on levers 50 and 54 as perhaps best shown in Figs. 4 and 5.

The sides 56 are preferably flat and may be outlined by ornamental and strengthening tubing 58. This tube is provided at the appropriate spot with a hole receiving a spring-pressed plunger 60 of a thumb piece 62 mounted on a bracket 64 secured to the extreme upper end of the extension 46, and by this means the rigid sides are maintained in their uppermost position as shown in Fig. 1. Merely, however, by releasing the plunger 60, the rigid sides tend to fall of their own weight and descend to the folded condition described.

To return the rigid sides 56 to the extended condition, it is merely necessary to grasp and pull them in an upward direction in which case they will swing on the levers as described and automatically receive plungers 60 which will hold them in place. The sides 56 are preferably connected by rods 66 which underlie the rods 16 so as to insure simultaneous motion of the two sides together and also to rigidify the frame. The rods 66 underlie the shackles 14 when the carriage is extended.

A hood 68 is provided which may be of the usual folding bow type and this hood is pivotally mounted at 70 on levers 72 pivoted at 74 to brackets 76. Each bracket 76 has a pair of spaced holes therein receiving spring-pressed thumb pieces 78 so that the hood is disposable in adjusted position relative to sides 56 as well as being foldable in the usual manner.

The pusher handle 80 is pivoted at 82 to the carriage sides and by means of a hinged bracket 84 it may be disposed at either end of the carriage and by means of well-known connecting means 86 the handle may be folded as for instance from the Fig. 1 position to a position at the opposite side of the device wherein it includes the folded-down hood 68 for the maximum saving of space in folding the carriage.

As shown in Fig. 1 the device is used as a solid side carriage but it is easily foldable as described. Additionally, the well 36 may be dropped and the device used as a stroller. The pusher handle may be arranged at either end for pushing the device in either direction. Ordinarily, the pusher handle 80 will be at the opposite end from that shown in Fig. 1 when the device is used as a carriage.

It will be seen that this invention provides a solid side convertible and foldable baby carriage and stroller which retains all the advantages of the non-folding type of carriage but at the same time is quickly and easily folded for storage and carrying purposes.

Having thus described my invention and the advantages thereof, I do not wish to be limited to the details herein disclosed otherwise than as set forth in the claims, but what I claim is:

1. A folding convertible carriage and stroller comprising a wheeled support, frame members thereon in substantially fixed relation thereto, a carriage body bottom member on the frame members, a pair of vertically swinging spaced levers at each side of the frame members, rigid carriage body sides, each mounted to swing on a pair of said levers, means latching the sides in the uppermost position thereof and cross braces connecting the carriage sides and located below the carriage body bottom.

2. A convertible folding carriage and stroller comprising a wheeled frame, spaced rods secured to the frame and terminating at corresponding ends in upstanding pieces, a pair of levers pivoted to each rod in spaced relation thereon, a rigid carriage body side mounted on each pair of levers for vertical swinging movement thereon, and latches on the upstanding pieces for holding the sides in uppermost position, the sides resting on the frame in down position thereof, a folding reversible pusher handle pivoted to the sides adjacent the lower edges thereof and being movable therewith.

3. A convertible folding carriage and stroller comprising a wheeled frame including transversely spaced longitudinal bowed springs, a rod secured to each spring, a carriage body bottom on the rods, a pair of spaced levers swingable in a vertical plane on each rod, a rigid carriage body side on each pair of levers and movable therewith between an extended position wherein the lower edges of the sides correspond in general to the carriage body bottom and a folded position wherein the sides are disposed well below the extended position.

4. A convertible folding carriage and stroller comprising a wheeled frame including transversely spaced longitudinal bowed springs, a rod secured to each spring, a carriage body bottom on the rods, a pair of spaced levers swingable in a vertical plane on each rod, a rigid carriage body side on each pair of levers and movable therewith between an extended position wherein the lower edges of the sides correspond in general to the carriage body bottom and a folded position wherein the sides are disposed well below the extended position, said sides being located laterally exteriorly relative to the said levers, springs, and rods.

5. A convertible folding carriage and stroller comprising a wheeled frame, a pair of longitudinal bowed springs thereon, a pair of shackles on each spring, a rod for each spring, each rod having down-turned ends secured to the shackles, a bar secured to each rod, each bar extending upwardly at one end thereof, a spring snap catch on each upwardly extending bar end, a pair of swinging levers on each bar, one lever being adjacent the upturned end and the other lever being located adjacent the opposite end of the bar, a rigid carriage body side suspended on the levers to swing therewith from an up position of use to a down position of folding, said catches releasably holding the sides.

WILLIAM C. TROENDLE.

References Cited in the file of this patent

UNITED STATES PATENTS

| Number | Name | Date |
|---|---|---|
| 2,451,956 | Kemper | Oct. 19, 1948 |

FOREIGN PATENTS

| Number | Country | Date |
|---|---|---|
| 576,775 | France | Aug. 26, 1924 |